United States Patent [19]
Markfelt

[11] 3,909,948
[45] Oct. 7, 1975

[54] ELECTRONIC WATER LEVEL INDICATOR

[75] Inventor: Reinhold S. Markfelt, Minneapolis, Minn.

[73] Assignee: Universal Oil Products Company, Des Plaines, Ill.

[22] Filed: Feb. 4, 1974

[21] Appl. No.: 439,492

[52] U.S. Cl. .............................. 33/126.5; 340/247
[51] Int. Cl.² .................................... G01F 23/04
[58] Field of Search.... 33/126.5; 340/244 A, 244 C, 340/244 D, 247; 200/61.05

[56] References Cited
UNITED STATES PATENTS

| | | | |
|---|---|---|---|
| 1,497,178 | 6/1924 | Lorenz | 33/126.5 |
| 1,498,960 | 6/1924 | Gardner | 33/126.5 |
| 1,555,802 | 9/1925 | Huber | 340/247 |
| 1,695,701 | 12/1928 | Steiner et al. | 33/126.5 |
| 2,480,490 | 8/1949 | Mark | 33/126.5 |
| 2,792,566 | 5/1957 | Shanhouse et al. | 340/244 C |
| 3,495,214 | 2/1970 | Wishart | 200/61.05 X |
| 3,534,352 | 10/1970 | Gallagher | 340/244 C |
| 3,614,762 | 10/1971 | Childs | 340/244 B |
| 3,631,440 | 12/1971 | Cliffgard | 340/244 C |

*Primary Examiner*—Richard E. Aegerter
*Assistant Examiner*—Charles E. Phillips
*Attorney, Agent, or Firm*—James R. Hoatson, Jr.; Barry L. Clark; William H. Page, II

[57] ABSTRACT

Lightweight, portable electronic water level indicator utilizes a probe with vertically spaced contacts attached to a 2 conductor light gauge cable. The cable is wrapped around a flanged storage hub which has winding handles on each side. A simple electronic circuit is switched on by the presence of water between the probe contacts to control a signal device such as a light bulb. The circuitry, the signal device and the two AA size batteries that provide the power are all carried within the relatively small diameter hub. In use, the cable is unwound into a water well until the light lights. One of the footage markers located at spaced intervals along the cable can then be observed to determine the depth location of the water in the well.

5 Claims, 6 Drawing Figures

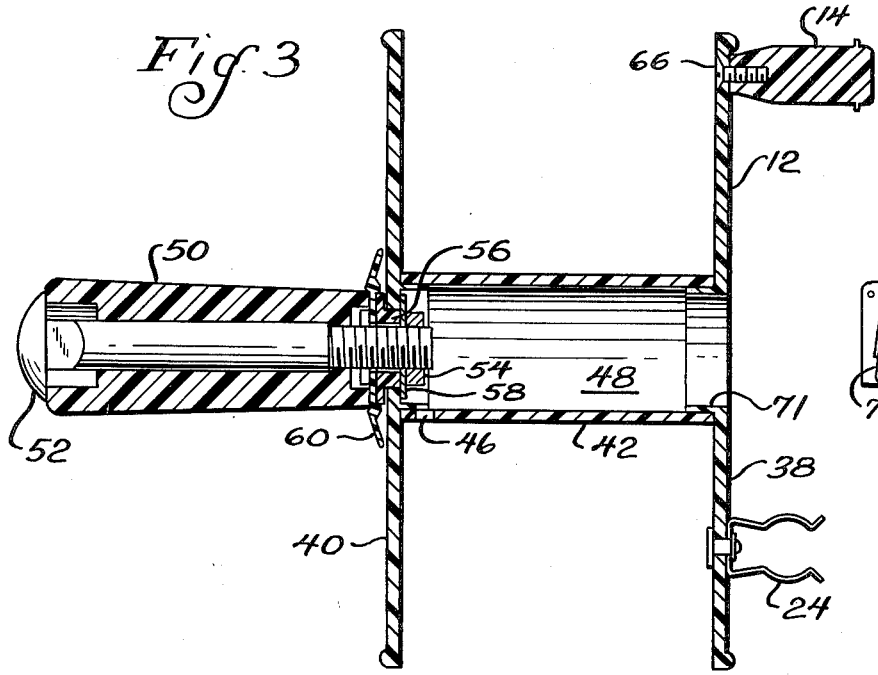
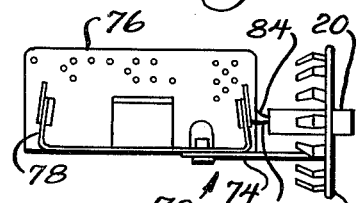
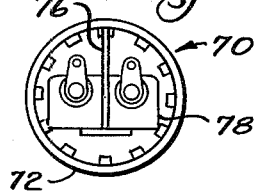
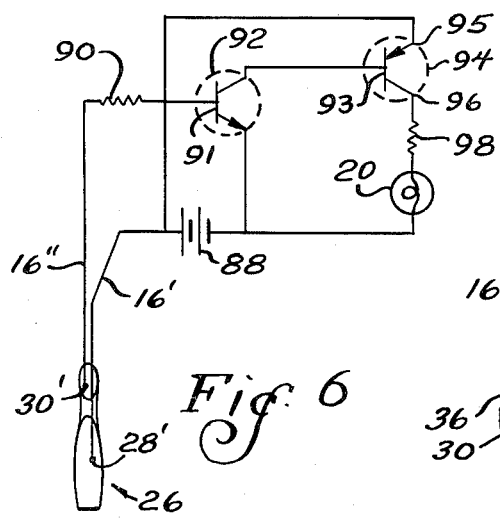
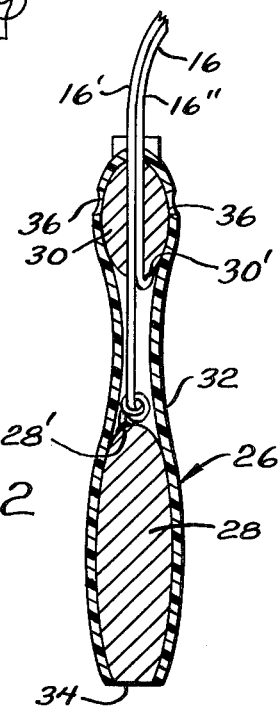
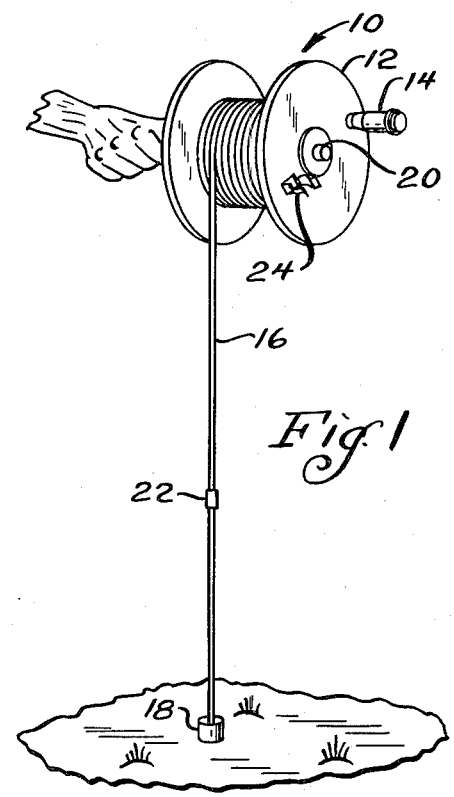

ELECTRONIC WATER LEVEL INDICATOR

BACKGROUND OF THE INVENTION

This invention relates to the measurement of water levels in wells. In the water well industry it is important to know what the static and pumping water levels are in a well. These levels can be measured in various ways. For instance, a chalked string or steel tape, when lowered into a well, shows the water level through the chalk getting wet and changing color. Such devices are adequate for shallow wells or where there is no cascading water in the casing. Other devices use a lead probe carried by a cable which completes a circuit through a milliamp meter when the probe contacts water. Such devices are generally quite large and difficult to handle. One such device is powered by a 45 volt battery, a type which is not readily available. Many of the prior art devices have both contacts at the bottom of the probe and give erroneous water level readings when the water is cascading in the well casing or when surface tension holds it to the end of the probe.

SUMMARY OF THE INVENTION

It is among the objects of the present invention to provide a water level indicator apparatus which is very compact in size and light in weight, which is very accurate, inexpensive and durable, and which utilizes low cost, readily available batteries in a circuit which actuates an electrical signal device with a minimum current drain.

These and other objects are attained by the apparatus of the present invention which comprises a winding reel having a plastic hub and a pair of side flanges. A two conductor depth measuring cable is wrapped around the hub and connected at its inner end to an electronic circuit inside the hub. The cable is marked at five foot intervals and has a probe at its outer end which comprises a pair of lead weights soldered to the conductors and held in insulated, spaced relationship by a length of vinyl heat shrunk tubing. The lower lead weight is exposed at its lower end and the upper lead weight is exposed through holes in the vinyl tubing. When the probe is lowered into a well to a depth such that water contacts both the lower and the upper lead weights the circuit is closed and a lamp or other signal device located in the hub is actuated. A transistorized circuit is provided to minimize the amount of the current required to actuate the signal device rather than have the signal device connected directly in series with the cable which is 250 – 500 feet long.

The hub of the apparatus is hollow and adapted to receive an electronics and signal device package through one of the side flanges. The electronics package includes a printed circuit board which supports a pair of transistors, a pair of resistors and a power supply. The electronic section is basically a direct-coupled DC amplifier. The power supply is two 1.5 volt AA size batteries connected in series to produce 3VDC. The plus side of the battery is connected to the lower half of the probe. The upper half of the probe is connected to the base of an N-P-N transistor. When the probe is submerged in water, it acts like a switch and allows current to be fed to the base of the N-P-N transistor. The amount of current fed to the base is regulated by a 47,000 ohm resistor and the resistivity of the water. When sufficient current is at the base of the N-P-N transistor, it allows current to pass through its emitter and collector to the base of a P-N-P transistor. The plus side of the battery is connected to the emitter of the P-N-P transistor and the collector is connected in series through the lamp and a 1.8 ohm resistor back to the negative side of the battery. With sufficient current at the base of the P-N-P transistor, it is turned on allowing current to pass through the incandescent lamp back to negative, lighting the lamp. When the probe is pulled out of the water, the circuit is broken shuting off the N-P-N transistor which in turn shuts off the P-N-P transistor stopping current flow through the lamp. The transistors comprise amplifier means which cause the small current flow through the portion of the circuit comprising the electrical cable and probe member to be greatly amplified in the portion of the circuit which includes the signal device. Thus the circuit reduces current flow through the probe leg to a minimum, allowing use of small, inexpensive batteries which nevertheless are very long-lived. The reduced current flow in the probe leg also reduces electrolytic corrosion of the contacts.

BRIEF DESCRIPTION OF THE DRAWINGS

FIG. 1 is a side sectional view of the cable winding reel;

FIG. 2 is a side elevational view of the electronics and signal subassembly which is adapted to be mounted within the hub of the reel shown in FIG. 1;

FIG. 3 is a left end view of the subassembly of FIG. 2;

FIG. 4 is a schematic diagram of the electronic circuit for operating the signal device;

FIG. 5 is a side sectional view of the probe used to sense the depth of water; and FIG. 6 is a perspective diagrammatic view of the water level indicator being used to sense the depth of water in a well.

DESCRIPTION OF THE PREFERRED EMBODIMENT

Referring to FIG. 1, the water level indicating apparatus indicated generally at 10 is depicted in operation. The apparatus includes a reel member 12 having a crank handle 14 attached to it for reeling and unreeling a small gauge electrical cable member 16 into and out of a hole in the ground such as that provided by well casing 18. When the cable 16 is unreeled sufficiently into the well to detect the presence of a water level, a signal device such as indicator light 20 mounted on the reel member 12 will be actuated. The signal could also comprise a buzzer. When the operator detects the signal he stops unreeling the cable 16 and notes the number (not shown) which appears on the footage indicator 22 positioned on the cable 16 closest to the well casing 18. The cable 16 is preferably provided with numbered indicators 22 at five foot intervals to facilitate the measuring of the depth. A probe holding clip 24 attached to the side of the reel member 12 serves as a storage facility for the water sensing probe member 26 (FIG. 2) attached to the outer end of cable 16. The probe 26 functions as a switch when water bridges a pair of vertically spaced contacts. The probe 26 includes a lower metallic member 28 such as a lead fishing sinker and an upper metallic member 30 which may also comprise a lead sinker. The conductors 16' and 16" which make up cable 16 are connected to the respective metal members 28, 30 at connection points 28',30'. The cable 16 may be of fine gauge wire such as 24 gauge speaker wire. The metal members 28,30 are separated and insulated from each other by a heat shrunk vinyl tube member 32. The bottom of the tube 32 is open so as to expose metal surface 34 to contact with a liquid into which the probe is lowered. The upper portion of the tubing 32 is perforated to expose metallic surfaces 36 of the upper metallic member 30. When the probe 26 is lowered into a body of water, the electrical resistance of the water contacting both the lower contact surface 34 and the upper contact surface 36 is sufficient to permit current to flow between conductors 16' and 16".

FIG. 3 shows the details of the reel mechanism 12 which comprises a pair of plastic side flange members 38,40 which are connected together, preferably by solvent welding, by a plastic hub member 42. An aperture 46 in the hub member 42 permits the inner end of the cable 16 to pass into the interior chamber 48 defined by the hub 42 wherein it is connected to the hereinafter described electronics and signaling package 70. A handle member 50 is mounted to the flange member 40 by means of a carriage bolt 52 and locknut member 54. Relative rotation between the handle 50 and flange 40 is made possible by the presence of a flanged plastic bushing member 56 and flat washer member 58. A finger guard member 60 prevents a user's fingers from rubbing against the reel flange 40 when the reel 12 is being rotated by crank handle 14. The crank handle 14 is shown as being non-rotatably attached to flange member 38 by a flat headed screw 66, but obviously could also be mounted for free rotation if desired.

FIGS. 4 and 5 are side and end views of the electronics and signal device sub-assembly 70 which is adapted to be snapped into chamber 48 and retained by the engagement of hole plug member 72 with the side wall 71 of an aperture formed in flange member 38. A support base 74 attached to the hole plug 72 supports a circuit board 76 and a battery holder 78. Lead wires 82,84 attached to lamp member 20 are attached to one of the contacts on the battery holder 78 and to an electrical circuit member (not shown) mounted on the circuit board 76.

FIG. 6 shows a schematic diagram of an electronics circuit which has proven to be quite satisfactory and which may be mounted on circuit board 76. The power supply for the circuit comprises a pair of 1½ volt AA size batteries schematically indicated at 88 which are connected in series. The batteries are adapted to be held in the battery holder 78 shown in FIGS. 4 and 5. The positive side of one of the batteries constituting power supply 88 is connected by conductor 16' to the lower portion of probe 26 at 28'. The upper half of the probe 26 is connected at 30' to the outer end of conductor 16". The inner end of conductor 16" is connected to one end of a 47,000 ohm ½ watt resistor 90 while the other end of the resistor 90 is connected to the base of an N-P-N transistor such as Type MPS 3705 made by Motorola. When the probe 26 is submerged in water, the presence of water between the spaced apart metallic contact surfaces 34 and 36 closes the circuit and allows a small current signal to be applied to the base 91 of the N-P-N transistor 92. The current signal which is applied to the base 91 is very small and is determined by the 47,000 ohm resistor 90 and the resistivity of the water between the contacts 34,36. When sufficient current signal is applied at the base 91 of the N-P-N transistor 92, a current flow is triggered through its emitter and collector to the base 93 of a P-N-P transistor 94 such as Type MPS 6562 made by Motorola. The plus side of the battery 88 is connected to the emitter 95 of the P-N-P transistor 94 and the collector 96 is connected in series through the lamp 20 and a 1.8 ohm resistor 98 back to the negative side of the battery 88. With sufficient current at the base 93 of the P-N-P transistor 94, it is turned on, allowing current to pass through the incandescent lamp 20 back to negative, lighting the lamp. When the probe 26 is pulled out of the water, the circuit is broken, shutting off the N-P-N transistor 92 which in turn shuts off the P-N-P transistor 94 stopping current flow through the lamp 20.

I claim as my invention:

1. Portable, hand held apparatus for indicating the level of water in a well comprising a hub member having a pair of spaced radial flanges, an electrical cable wound around said hub member, the inner end of said cable being connected to electronic circuit means removably contained within said hub and the outer end of said cable being connected to a probe member including a pair of electrical contact members, said pair of contact members being axially spaced and electrically insulated from each other along the length of the cable, distance measuring means on said cable along the length thereof, a pair of handles mounted on said flanges at opposite ends of said hub member for reeling and unreeling the cable on said hub member, a signal device connected to said electronic circuit means and removably mounted at least partially within said hub, and battery means removably mounted within said hub for providing power to said signal device when said electronic circuit means is energized by the presence of a water path between said pair of contact members, said electronic circuit means, said battery means and said signal device all being mounted on a support member which includes fastening means for locking it into an axial opening in said hub.

2. The apparatus of claim 1 wherein said electronic circuit means includes amplifier means, said amplifier means causing a small current signal in the portion of the circuit including the electrical cable and probe member to be greatly amplified in the portion of the circuit including the signal device.

3. The apparatus of claim 2 wherein said electronic circuit means further includes a current limiting resistor for limiting the flow of current in said cable.

4. The apparatus of claim 1 wherein one of said handles is mounted axially of said hub and for relative rotation therewith, and the other of said handles is mounted radially outwardly from said hub.

5. The apparatus of claim 1 wherein said signal device is an incandescent lamp.

\* \* \* \* \*